US012542374B2

(12) United States Patent
Zhang et al.

(10) Patent No.: US 12,542,374 B2
(45) Date of Patent: Feb. 3, 2026

(54) ORBITAL ANGULAR MOMENTUM (OAM) ANTENNA FOR GENERATING OAM BEAMS

(71) Applicant: QUALCOMM Incorporated, San Diego, CA (US)

(72) Inventors: Danlu Zhang, San Diego, CA (US); Min Huang, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 18/561,700

(22) PCT Filed: Jul. 13, 2021

(86) PCT No.: PCT/CN2021/105908
§ 371 (c)(1),
(2) Date: Nov. 16, 2023

(87) PCT Pub. No.: WO2023/283797
PCT Pub. Date: Jan. 19, 2023

(65) Prior Publication Data

US 2024/0372269 A1 Nov. 7, 2024

(51) Int. Cl.
*H01Q 21/20* (2006.01)
*H01Q 1/24* (2006.01)
*H01Q 21/24* (2006.01)

(52) U.S. Cl.
CPC ............. *H01Q 21/20* (2013.01); *H01Q 1/241* (2013.01); *H01Q 21/24* (2013.01)

(58) Field of Classification Search
None
See application file for complete search history.

(56) References Cited

U.S. PATENT DOCUMENTS 9,500,586 B2 * 11/2016 Ashrafi ................ G01N 33/483
2016/0292472 A1 * 10/2016 Tamburini ............ H04W 76/14
(Continued)

FOREIGN PATENT DOCUMENTS

CN 108594221 A * 9/2018 ............. G01S 13/89
CN 110210111 A 9/2019
(Continued)

OTHER PUBLICATIONS

International Search Report and Written Opinion—PCT/CN2021/105908—ISA/EPO—Apr. 15, 2022.
(Continued)

*Primary Examiner* — Crystal L Hammond
(74) *Attorney, Agent, or Firm* — Kevin M. Donnelly; Seyfarth Shaw LLP

(57) ABSTRACT

An orbital angular momentum (OAM) antenna includes two or more concentric antenna arrays, each of the antenna arrays corresponding to one or more OAM orders and including a different respective set of antenna elements arranged at a different respective radius, a difference between respective radii of each pair of adjacent antenna arrays of the two or more concentric antenna arrays decreasing as antenna array indexes associated with the respective pair of adjacent antenna arrays increase, each of the antenna array indexes satisfying a threshold index condition. The OAM antenna also includes two or more phase shifters, each of the phase shifters corresponding to a different respective antenna array of the two or more concentric antenna arrays and configured to trigger the respective set of antenna elements of the corresponding antenna array to generate a respective OAM beam.

27 Claims, 8 Drawing Sheets

(56) References Cited

U.S. PATENT DOCUMENTS

| | | | |
|---|---|---|---|
| 2017/0117626 | A1 | 4/2017 | Sajuyigbe et al. |
| 2021/0211168 | A1 | 7/2021 | Sasaki et al. |

FOREIGN PATENT DOCUMENTS

| | | | | | |
|---|---|---|---|---|---|
| CN | 110210111 | B | * | 2/2023 | ............. H01Q 21/00 |
| JP | 2017153018 | A | | 8/2017 | |

OTHER PUBLICATIONS

Zhao., et al., "Fractal Uniform Circular Arrays Based Multi-Orbital-Angular-Momentum-Mode Multiplexing Vortex Radio MIMO", China Communication, Sep. 30, 2018, pp. 118-135, The whole document.

Chen R., et al., "UCA-Based OAM Non-Orthogonal Multi-Mode Multiplexing", IEEE Open Journal of Antennas and Propagation, IEEE, vol. 2, Jan. 13, 2021, pp. 181-190, XP011834485, figure 2, figure 4, figure 5a, figure 6, Section I, 1st paragraph, Section II.A, Section III.B.

Lee D., et al., "An Experimental Demonstration of 28 GHz Band Wireless OAM-MIMO (Orbital Angular Momentum Multi-Input and Multi-Output) Multiplexing", 2018 IEEE 87th Vehicular Technology Conference (VTC Spring), IEEE Jun. 3, 2018, 5 Pages, XP033377616, figure 1, figure 2, Section III.B, Section I, 1st paragraph.

Supplementary European Search Report—EP21949592—Search Authority—The Hague—Mar. 10, 2025.

* cited by examiner

ORBITAL ANGULAR MOMENTUM (OAM) ANTENNA FOR GENERATING OAM BEAMS

FIELD OF THE DISCLOSURE

This disclosure relates generally to wireless communication, and specifically, to an orbital angular momentum (OAM) antenna and techniques for transmitting OAM beams via the OAM antenna.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promul gated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

An orbital angular momentum (OAM) beam is a type of orthogonal beam generated by an antenna array. The OAM beam may correspond to an OAM order that defines a number of times a phase of the OAM beam rotates around a beam axis. The OAM order may be characterized as a positive or negative integer l. In some examples, when an absolute value of the OAM order is greater than zero, the corresponding OAM beam has a singularity (for example, a low-intensity region) at the center of the OAM beam. In some examples, a helical phase front associated with an OAM beam may be generated by triggering elements of an antenna array based on linear phase precoding, such as digital precoding, an active phase shifter, or a Butler matrix.

SUMMARY

In some aspects of the present disclosure, an orbital angular momentum (OAM) antenna is presented. In such aspects, the OAM antenna includes two or more concentric antenna arrays. In some examples, each of the antenna arrays corresponds to one or more OAM orders and includes a different respective set of antenna elements arranged at a different respective radius. In some such examples, a difference between respective radii of each pair of adjacent antenna arrays of the two or more concentric antenna arrays decreases as antenna array indexes associated with the respective pair of adjacent antenna arrays increase. Additionally, in such examples, each of the antenna array indexes satisfies a threshold index condition. In such aspects, the OAM antenna also includes two or more phase shifters. In some examples, each of the phase shifters corresponds to a different respective antenna array of the two or more concentric antenna arrays and may be configured to trigger the respective set of antenna elements of the corresponding antenna array to generate a respective OAM beam.

In other aspects, a network device is presented. In such aspects, the network device includes an OAM antenna that includes two or more concentric antenna arrays. In some examples, each of the antenna arrays corresponds to one or more OAM orders and includes a different respective set of antenna elements arranged at a different respective radius. In some such examples, a difference between respective radii of each pair of adjacent antenna arrays of the two or more concentric antenna arrays decreases as antenna array indexes associated with the respective pair of adjacent antenna arrays increase. Additionally, in such examples, each of the antenna array indexes satisfies a threshold index condition. In such aspects, the network device also includes two or more phase shifters. In some examples, each of the phase shifters corresponds to a different respective antenna array of the two or more concentric antenna arrays and may be configured to trigger the respective set of antenna elements of the corresponding antenna array to generate a respective OAM beam. In such aspects, the network device also includes a processor and a memory communicatively coupled with the processor and storing instructions that, when executed by the processor, cause the network device to transmit a signal via the OAM beams.

In some other aspects, a method for wireless communication performed by an OAM antenna is presented. The method includes receiving, from a data source, a signal at two or more concentric antenna arrays. In some examples, each of the antenna arrays corresponds to one or more OAM orders and includes a different respective set of antenna elements arranged at a different respective radius. In some such examples, a difference between respective radii of each pair of adjacent antenna arrays of the two or more concentric antenna arrays decreases as antenna array indexes associated with the respective pair of adjacent antenna arrays increase. Additionally, in such examples, each of the antenna array indexes satisfies a threshold index condition. The method also includes controlling a timing of the different respective set of antenna elements. The method further includes transmitting the signal via an OAM beam generated from each of the antenna arrays based on the controlled timing.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
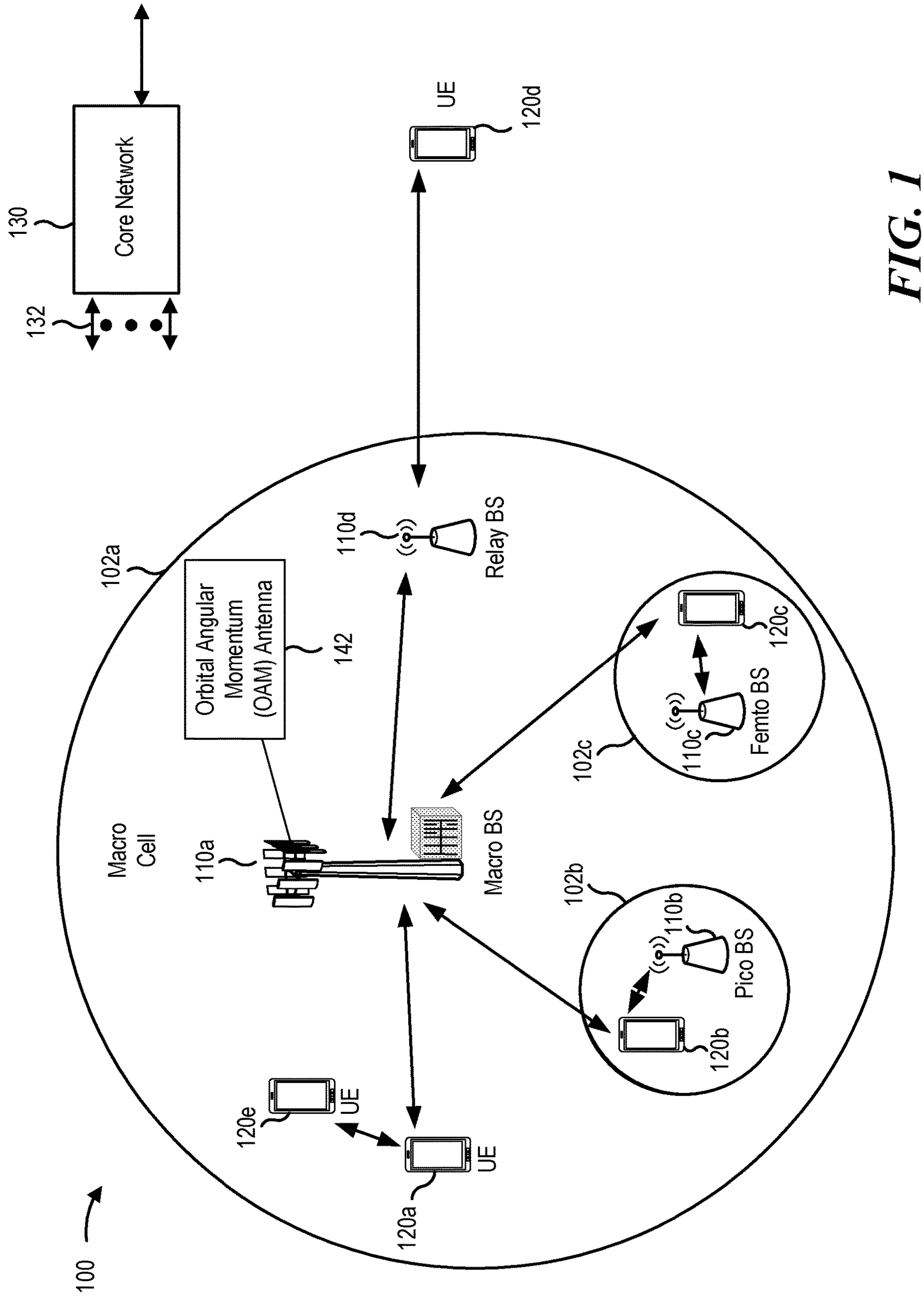
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

An orbital angular momentum (OAM) beam is a type of orthogonal beam generated by an antenna array. The OAM beam may correspond to an OAM order that defines a number of times a phase of the OAM beam rotates around a beam axis. The OAM order may be characterized as a positive or negative integer l. In some examples, when an absolute value of the OAM order is greater than zero, the corresponding OAM beam has a singularity (for example, a low-intensity region) at the center of the OAM beam. In some examples, a helical phase front associated with an OAM beam may be generated by triggering elements of an antenna array based on linear phase precoding. For example, digital precoding, an active phase shifter, or a Butler matrix may be used to generate an OAM beam by triggering elements of a singular antenna array. In some examples, OAM-formed weights may be applied to the elements of an antenna array to generate a single antenna port at the antenna array. In some examples, a set of OAM-formed weights for the elements of the antenna array may correspond to an OAM order, such that each antenna array of multiple antenna arrays at a transmitter or at a receiver may correspond to one or more OAM orders. In some examples, each OAM order l may correspond to an antenna array index n associated with an absolute value of the OAM order l. A transmission power associated with the OAM order may increase as a value of the associated antenna array index increases. As an example, a transmission power associated with antenna array index zero may be less than a transmission power associated with antenna array index two. To accommodate the increase in transmission power, a radius of each antenna array may increase based on the respective antenna array index of the respective OAM order associated with the antenna array. In some examples, a channel response of an OAM beam corresponding to the OAM order may be determined based on the radius of the transmitting antenna array corresponding to the OAM order, a radius of a corresponding receiving antenna array, and a distance between the transmitting antenna array and the receiving antenna array. In some examples, a relationship between a size of the radius and the antenna array antenna array index may be non-linear. Therefore, to maximize the channel response for each OAM order, it may be desirable to optimize the radius of each antenna array of an OAM antenna based on a function of the antenna array index of the corresponding OAM order.

Various implementations relate generally to an OAM antenna for generating OAM beams. Some implementations more specifically relate to an OAM antenna having two or more concentric antenna arrays. In such implementations, each antenna array of the two or more concentric antenna arrays has a different set of antenna elements and a different radius. In some examples, each concentric antenna array of the two or more concentric antenna arrays is a uniform circular phased antenna array. In such implementations, each antenna array of the two or more concentric antenna arrays corresponds to one or more OAM orders. As described above, a radius of each antenna array may be based on an antenna array index of a corresponding OAM order. In such implementations, a difference between respective radii of each pair of adjacent antenna arrays of the two or more concentric antenna arrays decreases as a value of antenna array indexes associated with the respective pair of two adjacent antenna arrays increases. In such implementations, the value of each of the antenna array indexes satisfies a threshold condition. In some examples, the value of each of the antenna array indexes satisfies the threshold condition based on a value of the respective antenna array index being greater than or equal to one. In some such implementations, the radius of each antenna array is based on a square root of the respective antenna array index associated with the antenna array. In some examples, the radius is linearly related to the square root.

Additionally, in some implementations, the OAM antenna also includes two or more phase shifters, each phase shifter corresponding to a different antenna array of the two or more concentric antenna arrays. In some examples, each phase shifter is hard-wired. Each phase shifter may be configured to trigger the set of antenna elements of a corresponding antenna array to generate an OAM beam.

Particular implementations of the subject matter described in this disclosure can be implemented to realize one or more of the following potential advantages. In some examples, a channel response associated with each OAM beam generated by the OAM antenna may be maximized by decreasing a difference between respective radii of each pair of adjacent antenna arrays of the two or more concentric antenna arrays as a value of antenna array indexes associated with the respective pair of adjacent antenna arrays increases. By maximizing the channel response, some aspects of the present disclosure may improve a quality of a channel established between an OAM beam transmitter and an OAM beam receiver.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The base stations 110 may include an OAM antenna 142 for receiving, from a data source, a signal at two or more concentric antenna arrays of the OAM antenna 142. In some examples, each of the antenna arrays corresponds to one or more OAM orders and includes a different respective set of antenna elements arranged at a different respective radius. In some such examples, a difference between respective radii of each pair of adjacent antenna arrays of the two or more concentric antenna arrays decreases as antenna array indexes associated with the respective pair of adjacent antenna arrays increase. Additionally, in such examples, each of the antenna array indexes satisfies a threshold index condition. The OAM antenna 142 may also control a timing of the different respective set of antenna elements. The OAM antenna 142 may further transmit the signal via an OAM beam generated from each of the antenna arrays based on the controlled timing.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

Figure 2:
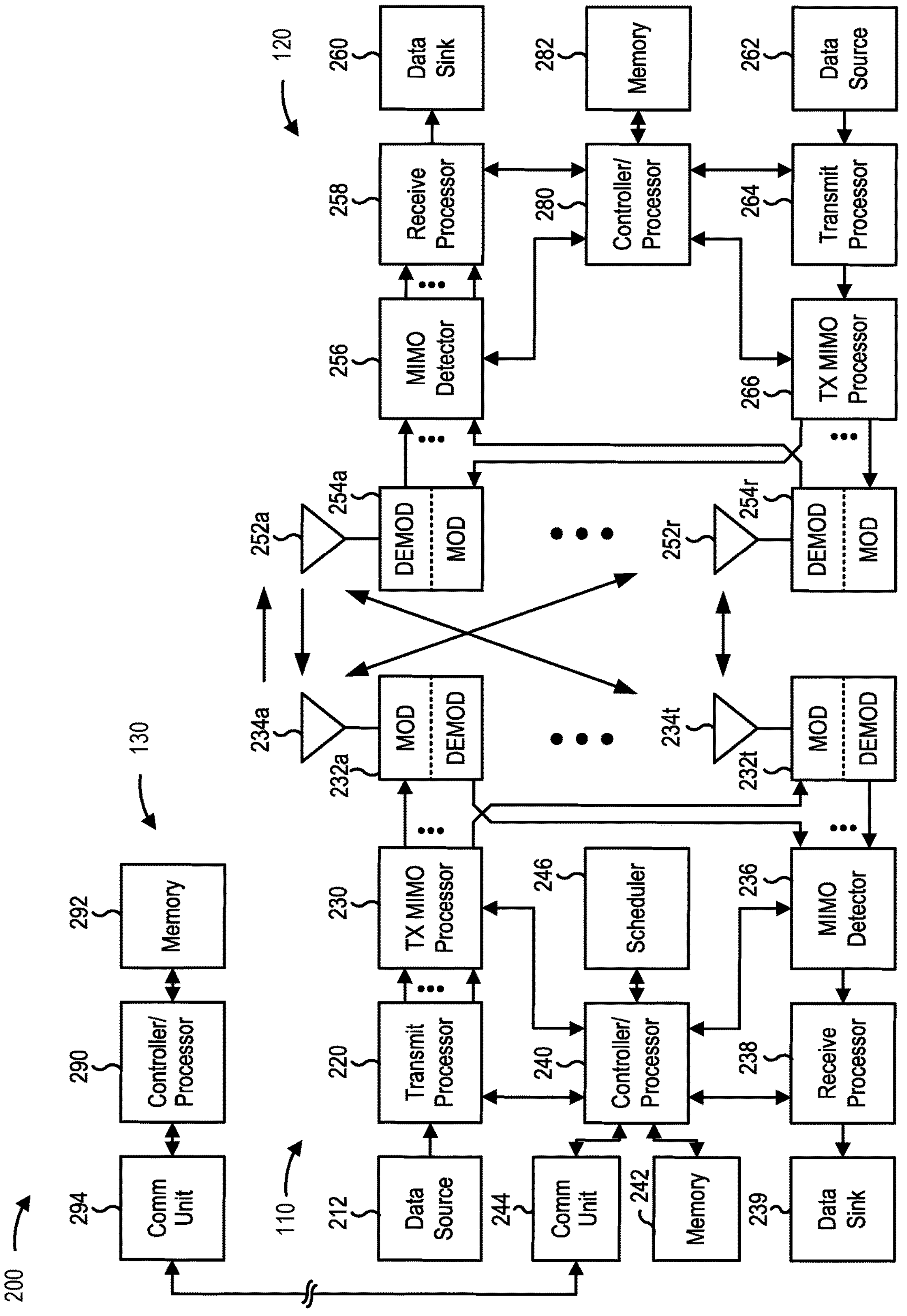
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with transmitting an OAM beam from an OAM antenna, as described in more detail elsewhere. For example, the controller/processor 240 of the base station 110, the controller/processor 280 of the UE 120, or any other component(s) of FIG. 1 may perform or direct operations of, for example, the process of FIG. 7 or other processes as described. Memories 242 and 282 may store data and program codes for the base station 110 and UE 120, respectively. A scheduler 246 may schedule UEs for data transmission on the downlink or uplink.

As described above, OAM beams are a set of orthogonal beams generated by an antenna array of an OAM antenna. In some examples, OAM beams may be used for a line-of-sight (LoS) multiple-input multiple-output (MIMO) system. In some examples, OAM beams may be used for short or middle-distance fixed communication. As an example, OAM beams from an OAM antenna may be used for wireless backhaul transmissions between a base station and a relay node. As another example, OAM beams from an OAM antenna may be used for fixed wireless access from a base station to a UE (for example, a fixed UE) or customer premise equipment (CPE). As yet another example, OAM beams from an OAM antenna may be used for inter-device transmissions between a fixed UE to another fixed UE (for example, inter-server connection in a data center). In some such examples, the OAM beams may be specified for communication in a high frequency bandwidth (for example, sub-THz or THz).

Figure 3A:
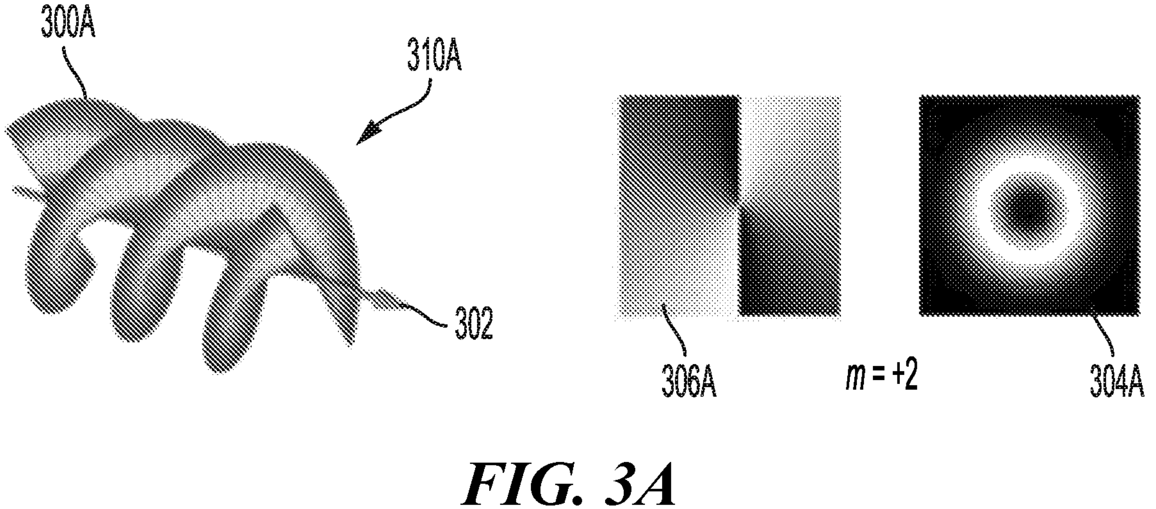
FIGS. 3A, 3B, 3C, 3D, and 3E are diagrams illustrating examples of helical structures of orbital angular momentum (OAM) beams corresponding to an OAM order.

FIG. 3A illustrates an example of a helical structure 300A of an OAM beam 310A corresponding to an OAM order (l). In the example of FIG. 3A, the helical structure 300A corresponds to an OAM order having a value of positive two, which defines a number of times a phase of the OAM beam 310A rotates around a beam axis 302. Additionally, in the example of FIG. 3A, the phase of the OAM beam 310A rotates twice around the beam axis 302 because the OAM order has an absolute value of two. The sign (for example, positive or negative) of the OAM order may determine a direction (for example, clockwise or counter-clockwise) of the rotation around the beam axis 302. The OAM beam 310A may also correspond to a phase front 306A and an intensity distribution 304A based on the corresponding OAM order. As shown in FIG. 3A, the intensity distribution 304A is ring-shaped, having a low-intensity region at the center of the ring. That is, in some examples, when an absolute value of the OAM order is greater than zero, the corresponding OAM beam 310A has a singularity (for example, a low-intensity region) at a center of the OAM beam.

Figure 3B:
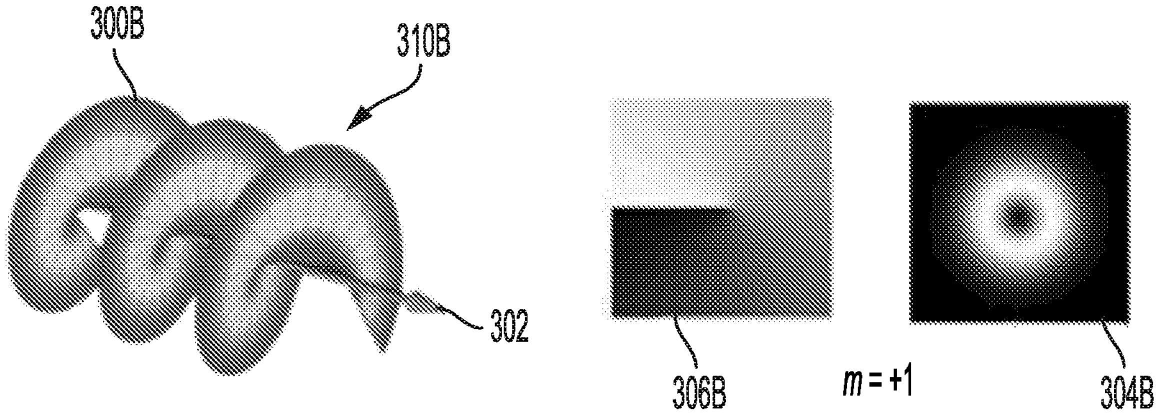

FIG. 3B illustrates an example of a helical structure 300B of an OAM beam 310B corresponding to an OAM order l. In the example of FIG. 3B, the helical structure 300B corresponds to an OAM order having a value of positive one, which defines a number of times a phase of the OAM beam 310B rotates around a beam axis 302. As shown in FIG. 3B, the phase of the OAM beam 310B rotates once around the beam axis 302 because the OAM order has an absolute value of one. The OAM beam 310B corresponds to a phase front 306B and an intensity distribution 304B based on the corresponding OAM order. As shown in FIG. 3B, the intensity distribution 304B of the OAM beam 310B is ring-shaped having a low-intensity region at the center of the ring based on an absolute value of the OAM order being greater than zero.

Figure 3C:
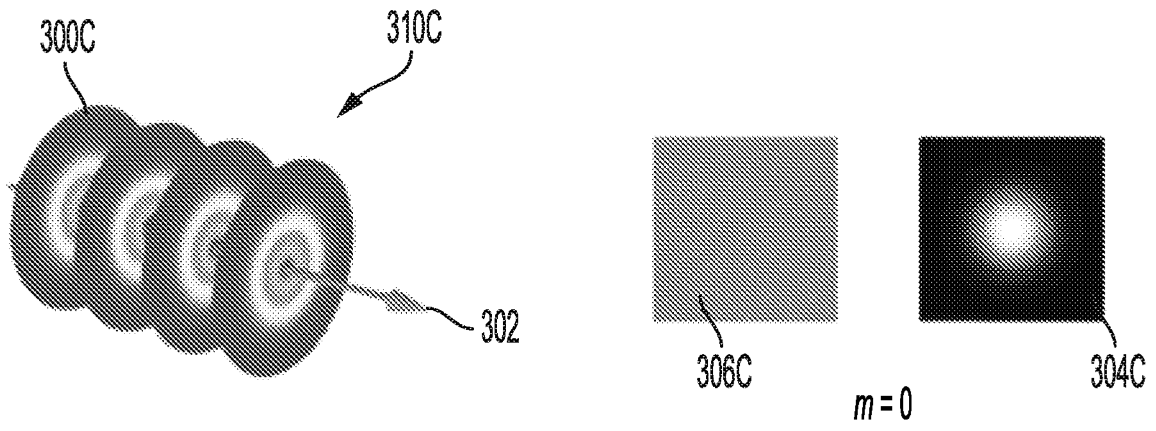

FIG. 3C illustrates an example of a helical structure 300C of an OAM beam 310C corresponding to an OAM order l. In the example of FIG. 3C, the helical structure 300C corresponds to an OAM order having a value of zero, which defines a number of times a phase of the OAM beam 310C rotates around a beam axis 302. As shown in FIG. 3C, the OAM beam 310C is planar and does not rotate around the beam axis 302 because the OAM order has a value of zero. The OAM beam 310C corresponds to a phase front 306C and an intensity distribution 304C based on the corresponding OAM order. As shown in FIG. 3C, the intensity distribution 304C is distinct from the ring-shaped intensity distributions 304A, 304B, 304D, and 304E, as described with respect to FIGS. 3A, 3B, 3D, and 3E, respectively.

Figure 3D:
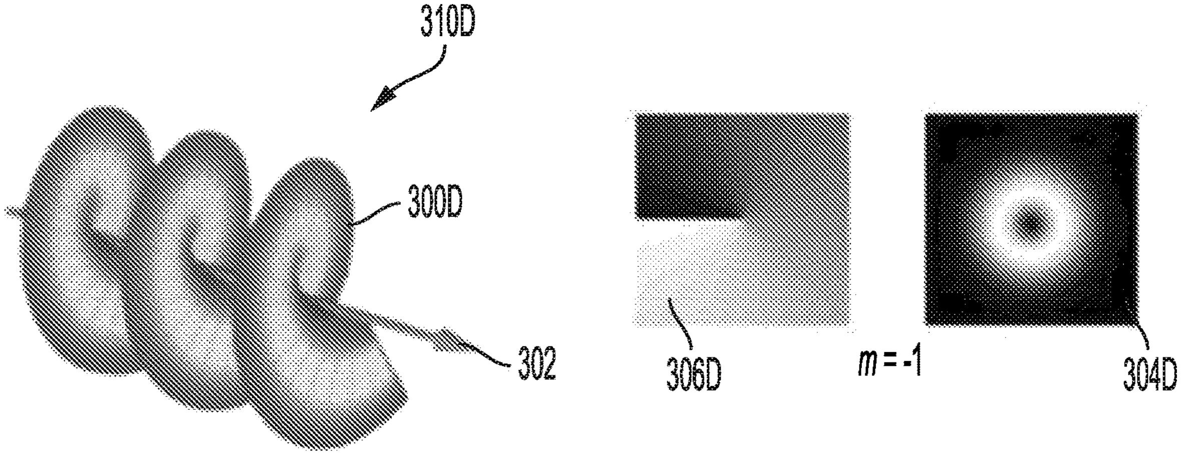

FIG. 3D illustrates an example of a helical structure 300D of an OAM beam 310D corresponding to an OAM order l. In the example of FIG. 3D, the helical structure 300D corresponds to an OAM order having a value of negative one, which defines a number of times a phase of the OAM beam 310D rotates around a beam axis 302. As shown in FIG. 3D, the phase of the OAM beam 310D rotates once around the beam axis 302 because the OAM order has an absolute value of one. The OAM beam 310D of FIG. 3D corresponds to a phase front 306D and an intensity distribution 304D based on the corresponding OAM order. As shown in FIG. 3D, the intensity distribution 304D is ring-shaped having a low-intensity region at the center of the ring based on an absolute value of the OAM order being greater than zero.

Figure 3E:
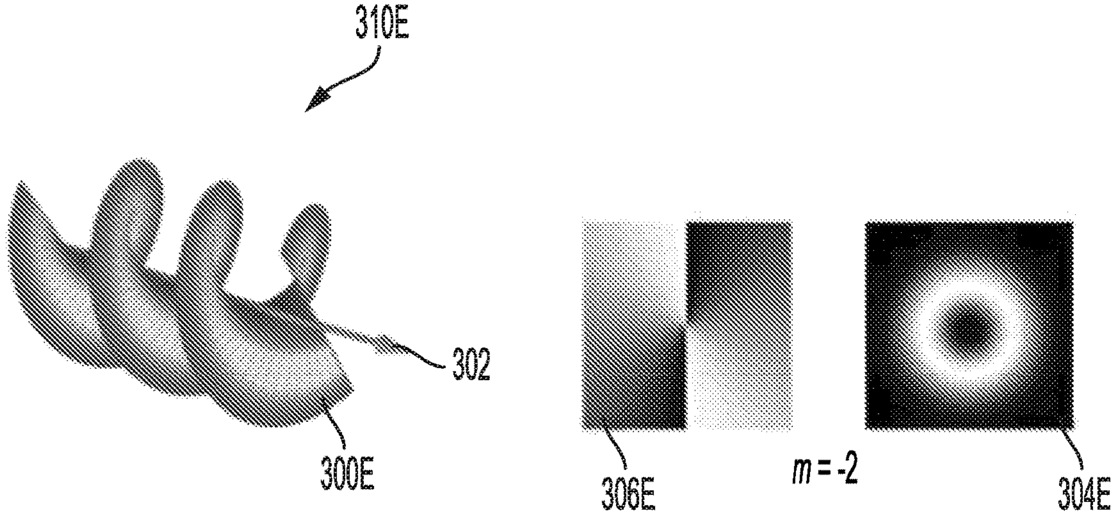

FIG. 3E illustrates an example of a helical structure 300E of an OAM beam 310E corresponding to an OAM order l. In the example of FIG. 3E, the helical structure 300E corresponds to an OAM order having a value of negative two, which defines a number of times a phase of the OAM beam 310E rotates around a beam axis 302. Additionally, in the example of FIG. 3E, the phase of the OAM beam 310E rotates once around the beam axis 302 because the OAM order has an absolute value of two. The OAM beam 310E corresponds to a phase front 306E and an intensity distribution 304E based on the corresponding OAM order. As shown in FIG. 3E, the intensity distribution 304E is ring-shaped having a low-intensity region at the center of the ring based on an absolute value of the OAM order being greater than zero.

As shown in FIGS. 3A, 3B, 3C, 3D, and 3E, a circular antenna array corresponding to a particular OAM order may generate a conical beam. In some examples, an OAM antenna (for example, an OAM communication transmitter) radiates multiple coaxially propagating and spatially-overlapping beams, where each beam corresponds to a respective OAM order. As described with respect to FIGS. 3A, 3B, 3C, 3D, and 3E, OAM beams transmitted from concentric antenna arrays of an OAM antenna may be orthogonal. Alternatively, OAM beams transmitted from concentric antenna arrays of different OAM antennas may be orthogonal if the OAM beams of the respective OAM antennas correspond to different OAM orders. The OAM beams transmitted from concentric antenna arrays of different OAM antennas may not be orthogonal if the OAM beams of the respective OAM antennas correspond to the same OAM order. In some examples, beamforming OAM beams along the radial direction may obtain additional degrees of freedom.

In some examples, an OAM beam may be an electromagnetic (EM) wave with a helical transverse phase exp $(i\varphi l)$, where a value $\varphi$ represents an azimuthal angle of an antenna element of an antenna array corresponding to the OAM beam, and a value l represents an OAM order as an unbounded integer. In some examples, each OAM order l may correspond to an antenna array index n associated with an absolute value of the OAM order l. In some examples, one or more OAM beams may be orthogonally received at a single OAM receiver. In such examples, OAM multiplexing may improve communication spectrum efficiency and reduce receiver complexity. Additionally, in some examples, a number of orthogonal streams may increase by polarizing each OAM order.

Figure 4:
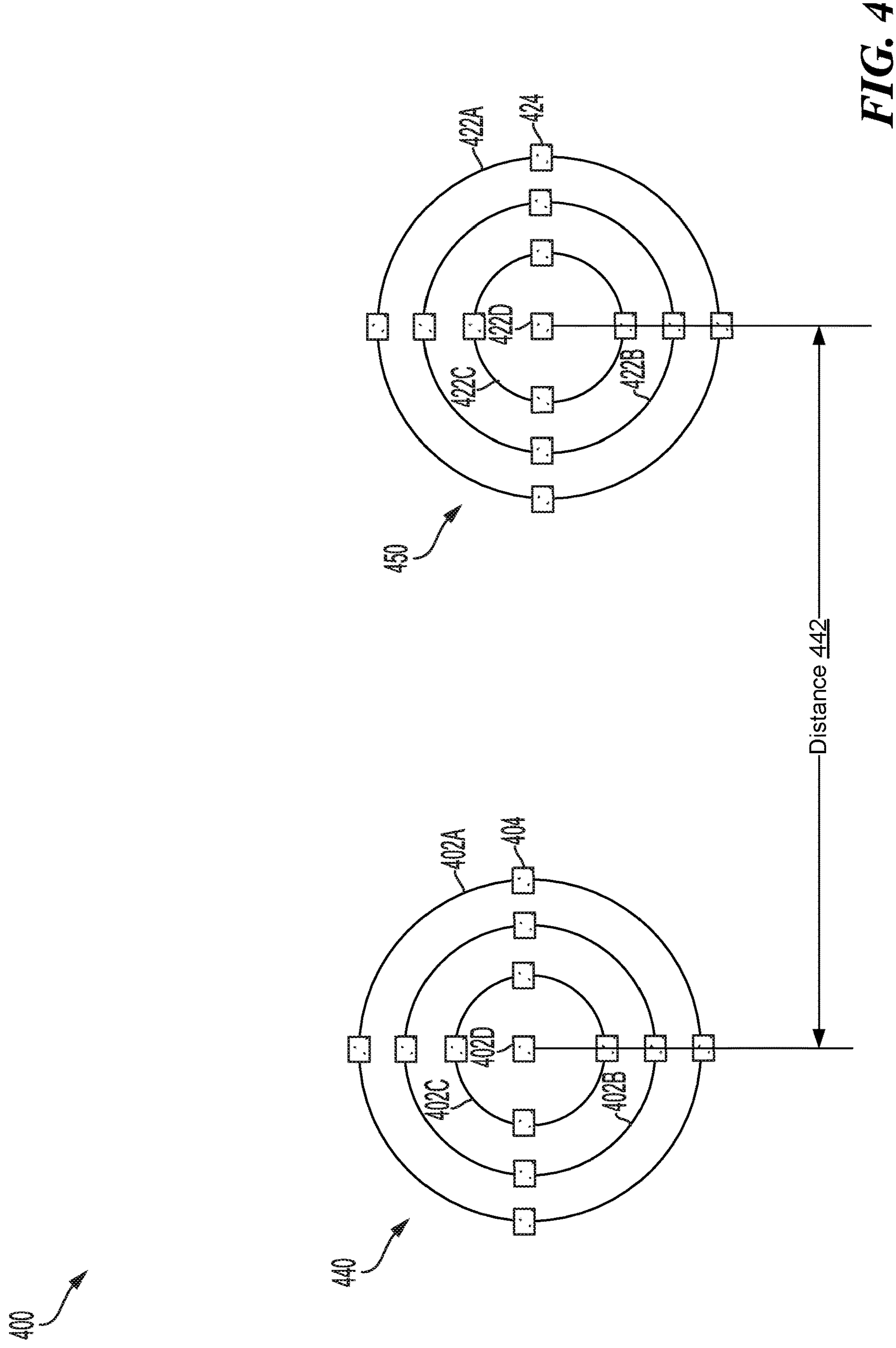
FIG. 4 is a diagram illustrating an example of an OAM-based communication system, in accordance with aspects of the present disclosure.

FIG. 4 is a diagram illustrating an example of an OAM-based communication system 400, in accordance with aspects of the present disclosure. In the example of FIG. 4, the OAM-based communication system 400 includes a transmitting OAM antenna 440 located at a distance 442 away from a receiving OAM antenna 450. As shown in FIG. 4, the transmitting OAM antenna 440 and the receiving OAM antenna 450 include multiple concentric antenna arrays 402A, 402B, 402C, 402D, 412A, 412B, 412C, and 412D, respectively. In some implementations, each concentric antenna array 402A, 402B, 402C, 402D, 412A, 412B, 412C, and 412D may be a circular array. As shown in FIG. 4, each respective antenna array 402A, 402B, 402C, 402D, 412A, 412B, 412C, and 412D includes a different set of antenna elements 404 and 424 and a different radius.

In the example of FIG. 4, a different weight (not shown in FIG. 4) may be applied to each antenna element 404 and 424. In some examples, a single port may be generated from an antenna array by applying the different weights to each antenna element 404 and 424. In such examples, an antenna array 402A, 402B, 402C, 402D, 412A, 412B, 412C, or 412D may correspond to an OAM order l if a weight of each antenna element 404 or 424 of the antenna array 402A, 402B, 402C, 402D, 412A, 412B, 412C, or 412D is equal to exp $(i\varphi l)$, where a value $\varphi$ represents an angle of each antenna element 404 or 424 in the antenna array 402A, 402B, 402C, 402D, 412A, 412B, 412C, or 412D. In some examples, different OAM orders may be generated by using different OAM-formed weights exp $(i\varphi l')$, where a value of a current OAM order l' does not equal a value of another OAM order l.

In some examples, each antenna array 402A, 402B, 402C, 402D, 412A, 412B, 412C, and 412D of an OAM antenna 440 and 450 may correspond to a different OAM order. Likewise, each antenna array 402A, 402B, 402C, 402D, 412A, 412B, 412C, and 412D of an OAM antenna 440 and 450 may correspond to an antenna array index of a corresponding OAM order. In such examples, a transmission power associated with an OAM order increases as a value of an antenna array index increases. As an example, a transmission power associated with antenna array index zero may be less than a transmission power associated with antenna array index two. To accommodate the increase in transmission power, a radius of an antenna array 402A, 402B, 402C, 402D, 412A, 412B, 412C, and 412D may increase based on an antenna array index of a corresponding OAM order. In some examples, a channel response associated with an OAM beam generated from a transmitting antenna array associated with an OAM order may be determined based on a radius of the transmitting antenna array, a radius of a corresponding receiving antenna array, and a distance between the transmitting antenna array and the receiving antenna array. In some examples, a relationship between a radius of an antenna array and a value of a corresponding OAM order may be non-linear. Therefore, it may be desirable to optimize a radius of each respective antenna array of an OAM antenna based on a function of a corresponding OAM order to maximize the channel response.

Figure 5:
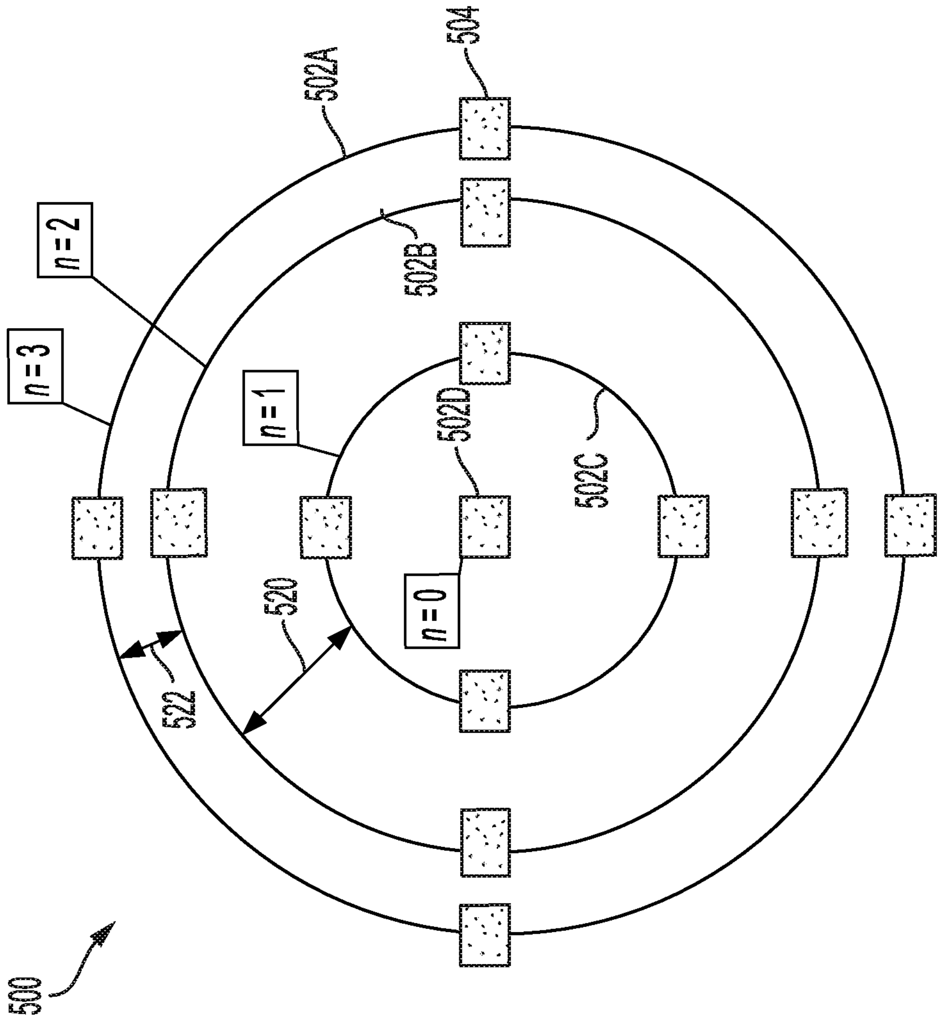
FIG. 5 is a diagram illustrating an example of an OAM antenna including multiple concentric antenna arrays, in accordance with aspects of the present disclosure.

FIG. 5 is a diagram illustrating an example of OAM antenna 500 including multiple concentric antenna arrays

502A, 502B, 502C, and 502D, in accordance with aspects of the present disclosure. In some implementations, each concentric antenna array 502A, 502B, 502C, and 502D may be a circular array. As shown in FIG. 5, each respective antenna array 502A, 502B, 502C, and 502D includes a different set of antenna elements 504 and has a different radius r. Additionally, each antenna array corresponds to a different OAM order l and an antenna array index n of the corresponding OAM order l. As an example, a first antenna array 502D corresponds to antenna array index 0 (n=0), a second antenna array 502C corresponds to antenna array index 1 (n=1), a third antenna array 502B corresponds to antenna array index 2 (n=2), and a fourth antenna array 502A corresponds to antenna array index 3 (n=3). As described, the radius of each respective antenna array 502A, 502B, 502C, and 502D may increase as a value of a corresponding antenna array index increases.

In some examples, a channel response associated with an OAM order l may be based on a radius $r_1$ of a transmitting antenna array and a radius $r_2$ of a receiving antenna array. Specifically, the channel response may be a function of $r_1r_2/\lambda z$, where a value z represents a distance between the transmitting antenna array and the receiving antenna array. For ease of explanation, the radius $r_1$ of a transmitting antenna array may be referred to as a transmitting array radius $r_1$ and the radius $r_2$ of a receiving antenna array may be referred to as a receiving array radius $r_2$. In some implementations, the radius $r_1$ of a transmitting antenna array and the radius $r_2$ of a receiving antenna array for an OAM order l may be set to maximize the channel response associated with the OAM order l. In some examples, the transmitting array radius $r_1$ and the receiving array radius $r_2$ may increase at a same, or substantially similar rate, as an antenna array index n of a corresponding OAM order l increases. In some implementations, an optimal transmitting array radius $r_1(n)$ and an optimal receiving array radius $r_2(n)$, which correspond to antenna array index n, may linearly increase with a value of a corresponding antenna array index n. In such implementations, the optimal transmitting array radius $r_1(n)$ and the optimal receiving array radius $r_2(n)$ may be proportional (for example, linearly related) to a square root of the antenna array index n (for example, $r_1(n)\propto\sqrt{n}$, $r_2(n)\propto\sqrt{n}$). In some examples, a non-zero intercept b may exist, such that $r_1(n)=a\sqrt{n}+b$, where a parameter a represents a slope of an optimal radius with respect to the OAM order l.

In some implementations, the optimal transmitting array radius $r_1(n)$ and the optimal receiving array radius $r_2(n)$ increase at a different rate than a value of the antenna array index n based on a distance between a transmitting antenna array and a receiving antenna array satisfying a distance condition. In some examples, the distance condition may be satisfied when the distance between the transmitting antenna array and the receiving antenna array is equal to or greater than a threshold. In such implementations, the optimal transmitting array radius $r_1(n)$ and the optimal receiving array radius $r_2(n)$ may still be proportional to a square root of the antenna array index n.

In some examples, because the optimal transmitting array radius $r_1(n)$ and the optimal receiving array radius $r_2(n)$ may be proportional to a square root of the OAM order n, a difference between respective radii of two adjacent antenna arrays of a same OAM antenna decreases as a respective antenna array index n corresponding to each of the pair of adjacent antenna arrays increases. Specifically, in such examples, the optimal transmitting array radius $r_1(n)$ and the optimal receiving array radius $r_2(n)$, and the optimal transmitting array radius $r_1(n)$ and the optimal receiving array radius $r_2(n)$ do not increase linearly with the antenna array index n. Rather, a difference between radii of adjacent antenna arrays ($r_1(n)-r_1(n-1)$, $r_2(n)-r_2(n-1)$, etc.) decrease as a value of an antenna array index n increases from one antenna array of the adjacent antenna arrays to another antenna array of the adjacent antenna arrays.

FIG. 5 illustrates examples of differences 520 and 522 between respective radii of two adjacent antenna arrays. As an example, the second antenna array 502C and the third antenna array 502B may have a first difference 520 between respective radii. As another example, the third antenna array 502B and the fourth antenna array 502A may have a second difference 522 between respective radii. In the example of FIG. 5, the second difference 522 is less than the first difference 520. In some implementations, the antenna array 502D corresponding to antenna array index zero may be excluded from the radii differences specified for two adjacent antenna arrays. Therefore, in some such implementations, a difference between respective radii of two adjacent antenna arrays decreases as a respective antenna array index n corresponding to each of the two adjacent antenna arrays increases, and the respective antenna array index n satisfies a threshold index condition. In some such implementations, the respective antenna array index n satisfies the threshold condition based on a value of the respective antenna array index n being greater than or equal to one.

In some implementations, a minimum transmitting array radius $r_1(n)$ and a minimum receiving array radius $r_2(n)$ may be specified for a minimum distance between a transmitting antenna array and a receiving antenna array. The minimum radii $r_1(n)$ and $r_2(n)$ may be specified to improve a probability that the receiving antenna array receives OAM beams corresponding to low OAM orders, such as OAM order zero. In some examples, at a distance that is greater than or equal to a threshold, an OAM beam corresponding to OAM order zero may be received by a receiving antenna array corresponding to an OAM order greater than zero. In such examples, an OAM order of an antenna array transmitting an OAM beam may be less than an OAM order of an antenna array receiving the OAM beam. Additionally, some receiving antenna arrays may not receive an OAM beam.

Figure 6:
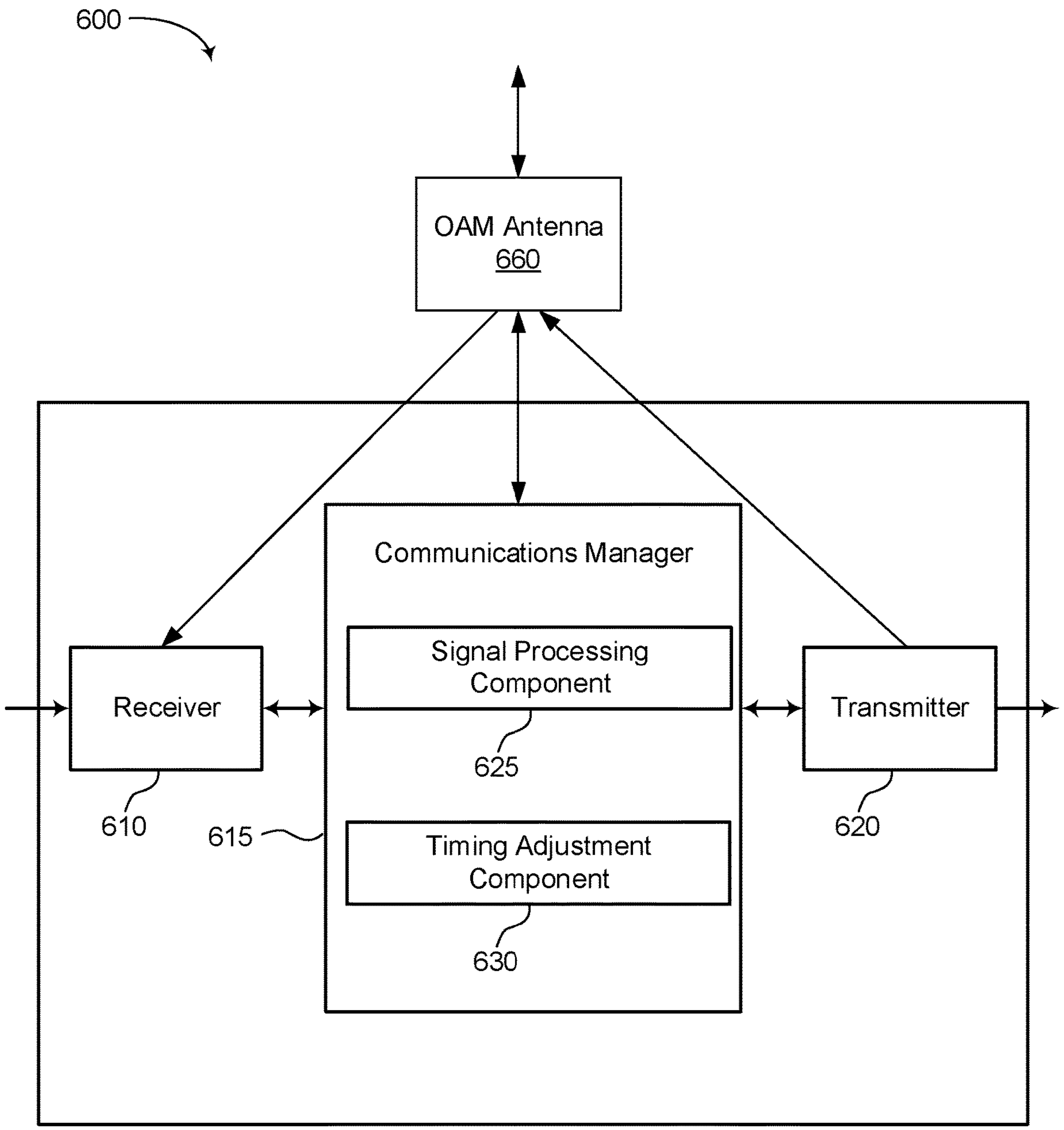
FIG. 6 is a block diagram of a wireless communication device that includes an OAM antenna configured to generate one or more OAM beams, in accordance with aspects of the present disclosure.

FIG. 6 shows a block diagram of a wireless communication device 600 that includes an OAM antenna 660 configured to generate one or more OAM beams, in accordance with aspects of the present disclosure. The wireless communication device 600 may be an example of aspects of a base station 110, described with reference to FIGS. 1 and 2. The wireless communication device 600 may include a receiver 610, a communications manager 615, and a transmitter 620, which may be in communication with one another (for example, via one or more buses). In some implementations, the receiver 610 and the transmitter 620 may operate in conjunction with the OAM antenna 660. In some examples, the wireless communication device 600 is configured to perform operations, including operations of the process 700 described below with reference to FIG. 7.

In some examples, the wireless communication device 600 can include a chip, system on chip (SoC), chipset, package, or device that includes at least one processor and at least one modem (for example, a 5G modem or other cellular modem). In some examples, the communications manager 615, or its sub-components, may be separate and distinct components. In some examples, at least some components of the communications manager 615 are implemented at least in part as software stored in a memory. For example, portions of one or more of the components of the communications manager 615 can be implemented as non-transitory code executable by the processor to perform the functions or operations of the respective component.

The receiver 610 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110, described with reference to FIGS. 1 and 2.

The received information may be passed on to other components of the wireless communication device 600. The receiver 610 may be an example of aspects of the receive processor 238 described with reference to FIG. 2. The receiver 610 may include a set of radio frequency (RF) chains that are coupled with or otherwise utilize a set of antennas (for example, the set of antennas may be an example of aspects of the antennas 252*a* through 252*r* or the OAM antenna 404 or 500 described with reference to FIGS. 2, 4, and 5 respectively).

The transmitter 620 may transmit signals generated by the communications manager 615 or other components of the wireless communication device 600. In some examples, the transmitter 620 may be collocated with the receiver 610 in a transceiver. The transmitter 620 may be an example of aspects of the transmit processor 220 described with reference to FIG. 2. The transmitter 620 may be coupled with or otherwise utilize a set of antennas (for example, the set of antennas may be an example of aspects of the antennas 234*a* through 234*t* or the OAM antenna 404 or 500 described with reference to FIGS. 2, 4, and 5 respectively), which may be antenna elements shared with the receiver 610. In some examples, the transmitter 620 is configured to transmit control information in a physical uplink control channel (PUCCH) and data in a physical uplink shared channel (PUSCH).

The communications manager 615 may be an example of aspects of the controller/processor 240 described with reference to FIG. 2. The communications manager 615 includes a signal processing component 625 and a timing adjustment component 630. Working in conjunction with the transmitter 620, the signal processing component 625 is configured to generate a signal and provide the generate signal to one or more concentric antenna arrays of the OAM antenna 660. Working in conjunction with the transmitter 620, the timing adjustment component 630 is configured to control a timing of a set of antenna elements of each respective antenna array of the concentric antenna arrays of the OAM antenna 660. In some implementations, the timing adjustment component 630 may be a phase shifter.

Figure 7:
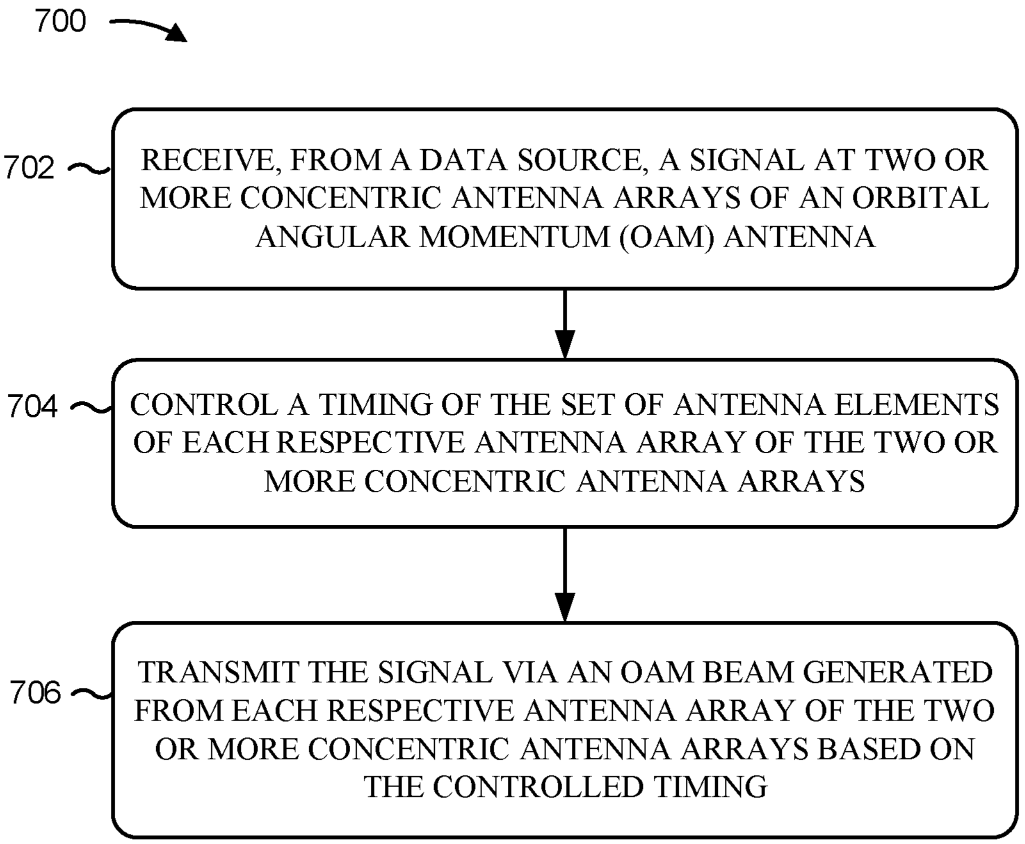
FIG. 7 is a flow diagram illustrating an example process performed, for example, with an OAM antenna, in accordance with various aspects of the present disclosure.

FIG. 7 is a flow diagram illustrating an example process 700 performed, for example, with an OAM antenna, in accordance with various aspects of the present disclosure. The example process 700 is an example of performing communications by an OAM antenna. In some implementations, the process 700 may be performed by a an OAM antenna, such as the OAM antenna 142, 440, 500, or 660 described above with reference to FIGS. 1, 4, 5, and 6, respectively. The OAM antenna may be integrated with a wireless communication device, such as a base station 110 described above with reference to FIG. 1.

As shown in FIG. 7, the process 700 begins at block 702 by receiving, from a data source, a signal at two or more concentric antenna arrays of the OAM antenna. In some examples, each of the antenna arrays corresponds to one or more OAM orders and includes a different respective set of antenna elements arranged at a different respective radius. In some such examples, a difference between respective radii of each pair of adjacent antenna arrays of the two or more concentric antenna arrays decreases as antenna array indexes associated with the respective pair of adjacent antenna arrays increase. Additionally, in such examples, each of the antenna array indexes satisfies a threshold index condition. Additionally, at block 704, the process 700 controls a timing of the different respective set of antenna elements. Furthermore, at block 706, the process 700 transmits the signal via an OAM beam generated from each of the antenna arrays based on the controlled timing.

The following provides an overview of some Aspects of the present disclosure:

Aspect 1. An OAM antenna, comprising: a plurality of concentric antenna arrays, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition; and a plurality of phase shifters, each of the phase shifters corresponding to a different respective antenna array of the plurality of concentric antenna arrays and configured to trigger the respective set of antenna elements of the corresponding antenna array to generate a respective OAM beam.

Aspect 2. The OAM antenna of Aspect 1, wherein the radius of each antenna array is based on a square root of a corresponding antenna array index.

Aspect 3. The OAM antenna of Aspect 2, wherein the radius is linearly related to the square root.

Aspect 4. The OAM antenna of any one of Aspects 1-3, wherein each of the antenna array indexes satisfies the threshold condition based on a value of the respective antenna array index being greater than or equal to one.

Aspect 5. The OAM antenna of any one of Aspects 1-4, wherein each of the antenna arrays is a phased antenna array.

Aspect 6. The OAM antenna of any one of Aspects 1-5, wherein each OAM order of the one or more OAM orders corresponding to each of the antenna arrays defines a number of times a phase of the respective OAM beam rotates around a central axis.

Aspect 7. The OAM antenna of any one of Aspects 1-6, wherein the radius of each of the antenna arrays satisfies a minimum radius value based on a corresponding antenna array index being less than an antenna array index threshold value.

Aspect 8. The OAM antenna of any one of Aspects 1-7, wherein each of the antenna arrays is a uniform circular array.

Aspect 9. A network device comprising: an OAM antenna comprising: a plurality of concentric antenna arrays, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition; and a plurality of phase shifters, each of the phase shifters corresponding to a different respective antenna array of the plurality of concentric antenna arrays and configured to trigger the respective set of antenna elements of the corresponding antenna array to generate a respective OAM beam; a processor; and a memory communicatively coupled with the processor and storing instructions that, when executed by the processor, cause the network device to transmit a signal via the OAM beams.

Aspect 10. The network device of Aspect 9, wherein the radius of each antenna array is based on a square root of a corresponding antenna array index.

Aspect 11. The network device of Aspect 10, wherein the radius is linearly related to the square root.

Aspect 12. The network device of any one of Aspects 9-11, wherein the antenna array index satisfies the threshold index condition based on a value of the antenna array index being greater than or equal to one.

Aspect 13. The network device of any one of Aspects 9-12, wherein each of the antenna arrays is a phased antenna array.

Aspect 14. The network device of any one of Aspects 9-13, wherein each OAM order of the one or more OAM orders corresponding to each of the antenna arrays defines a number of times a phase of the respective OAM beam rotates around a central axis.

Aspect 15. The network device of any one of Aspects 9-14, wherein the radius of each of the antenna arrays satisfies a minimum radius value based on a corresponding antenna array index being less than an antenna array index threshold value.

Aspect 16. The network device of any one of Aspects 9-15, wherein each of the antenna arrays is a uniform circular array.

Aspect 17. The network device of any one of Aspects 9-16, wherein the signal transmits information for a peer-to-peer backhaul transmission.

Aspect 18. The network device of any one of Aspects 9-17, wherein the signal transmits information for a peer-to-peer fronthaul transmission.

Aspect 19. A method for wireless communication performed by an OAM antenna, comprising: receiving, from a data source, a signal at a plurality of concentric antenna arrays of the OAM antenna, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition; controlling a timing of the different respective set of antenna elements; and transmitting the signal via an OAM beam generated from each of the antenna arrays based on the controlled timing.

Aspect 20. The method Aspect 19, wherein the radius of each antenna array is based on a square root of a corresponding antenna array index.

Aspect 21. The method of Aspect 20, wherein the radius is linearly related to the square root.

Aspect 22. The method of any one of Aspects 19-21, wherein the antenna array index satisfies the threshold index condition based on a value of the antenna array index being greater than or equal to one.

Aspect 23. The method of any one of Aspects 19-22, wherein the timing is controlled by a plurality of phase shifters, each of the phase shifters corresponding to a different respective antenna array of the plurality of concentric antenna arrays.

Aspect 24. The method of any one of Aspects 19-23, wherein the signal transmits information for a peer-to-peer backhaul transmission.

Aspect 25. The method of any one of Aspects 19-24, wherein the signal transmits information for a peer-to-peer fronthaul transmission.

Aspect 26. The method of any one of Aspects 19-25, wherein each of the antenna arrays is a uniform circular array.

Aspect 27. The method of any one of Aspects 19-26, wherein each of the antenna arrays is a phased antenna array.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles “a” and “an” are intended to include one or more items, and may be used interchangeably with “one or more.” Furthermore, as used, the terms “set” and “group” are intended to include one or more items (e.g., related items, unrelated items, a combination of related and unrelated items, and/or the like), and may be used interchangeably with “one or more.” Where only one item is intended, the phrase “only one” or similar language is used. Also, as used, the terms “has,” “have,” “having,” and/or the like are intended to be open-ended terms. Further, the phrase “based on” is intended to mean “based, at least in part, on” unless explicitly stated otherwise

What is claimed is:

1. An orbital angular momentum (OAM) antenna, comprising:

a plurality of concentric antenna arrays, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition; and a plurality of phase shifters, each of the phase shifters corresponding to a different respective antenna array of the plurality of concentric antenna arrays and configured to trigger the respective set of antenna elements of the corresponding antenna array to generate a respective OAM beam.

2. The OAM antenna of claim 1, wherein the radius of each antenna array is based on a square root of a corresponding antenna array index.

3. The OAM antenna of claim 2, wherein the radius is linearly related to the square root.

4. The OAM antenna of claim 1, wherein each of the antenna array indexes satisfies the threshold condition based on a value of the respective antenna array index being greater than or equal to one.

5. The OAM antenna of claim 1, wherein each of the antenna arrays is a phased antenna array.

6. The OAM antenna of claim 1, wherein each OAM order of the one or more OAM orders corresponding to each of the antenna arrays defines a number of times a phase of the respective OAM beam rotates around a central axis.

7. The OAM antenna of claim 1, wherein the radius of each of the antenna arrays satisfies a minimum radius value based on a corresponding antenna array index being less than an antenna array index threshold value.

8. The OAM antenna of claim 1, wherein each of the antenna arrays is a uniform circular array.

9. A network device comprising:

an orbital angular momentum (OAM) antenna comprising:

a plurality of concentric antenna arrays, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition; and a plurality of phase shifters, each of the phase shifters corresponding to a different respective antenna array of the plurality of concentric antenna arrays and configured to trigger the respective set of antenna elements of the corresponding antenna array to generate a respective OAM beam;

at least one processor; and at least one memory communicatively coupled with the at least one processor and storing instructions that, when executed by the at least one processor, cause the network device to transmit a signal via the OAM beams.

10. The network device of claim 9, wherein the radius of each antenna array is based on a square root of a corresponding antenna array index.

11. The network device of claim 10, wherein the radius is linearly related to the square root.

12. The network device of claim 9, wherein the antenna array index satisfies the threshold index condition based on a value of the antenna array index being greater than or equal to one.

13. The network device of claim 9, wherein each of the antenna arrays is a phased antenna array.

14. The network device of claim 9, wherein each OAM order of the one or more OAM orders corresponding to each of the antenna arrays defines a number of times a phase of the respective OAM beam rotates around a central axis.

15. The network device of claim 9, wherein the radius of each of the antenna arrays satisfies a minimum radius value based on a corresponding antenna array index being less than an antenna array index threshold value.

16. The network device of claim 9, wherein each of the antenna arrays is a uniform circular array.

17. The network device of claim 9, wherein the signal transmits information for a peer-to-peer backhaul transmission.

18. The network device of claim 9, wherein the signal transmits information for a peer-to-peer fronthaul transmission.

19. A method for wireless communication performed by an orbital angular momentum (OAM) antenna, comprising:

receiving, from a data source, a signal at a plurality of concentric antenna arrays of the OAM antenna, each of the antenna arrays corresponding to one or more OAM orders and being comprised of a different respective set of antenna elements arranged at a different respective radius, a difference between respective radii of each pair of adjacent antenna arrays of the plurality of concentric antenna arrays decreasing as antenna array indexes associated with the respective pair of adjacent antenna arrays increase, each of the antenna array indexes satisfying a threshold index condition;

controlling a timing of the different respective set of antenna elements; and transmitting the signal via an OAM beam generated from each of the antenna arrays based on the controlled timing.

20. The method claim 19, wherein the radius of each antenna array is based on a square root of a corresponding antenna array index.

21. The method of claim 20, wherein the radius is linearly related to the square root.

22. The method of claim 19, wherein the antenna array index satisfies the threshold index condition based on a value of the antenna array index being greater than or equal to one.

23. The method of claim 19, wherein the timing is controlled by a plurality of phase shifters, each of the phase shifters corresponding to a different respective antenna array of the plurality of concentric antenna arrays.

24. The method of claim 19, wherein the signal transmits information for a peer-to-peer backhaul transmission.

25. The method of claim 19, wherein the signal transmits information for a peer-to-peer fronthaul transmission.

26. The method of claim 19, wherein each of the antenna arrays is a uniform circular array.

27. The method of claim 19, wherein each of the antenna arrays is a phased antenna array.

* * * * *